Dec. 9, 1947.  C. PETERS  2,432,336
INDEXING AND DIVIDING APPARATUS
Filed Feb. 16, 1945  2 Sheets-Sheet 1
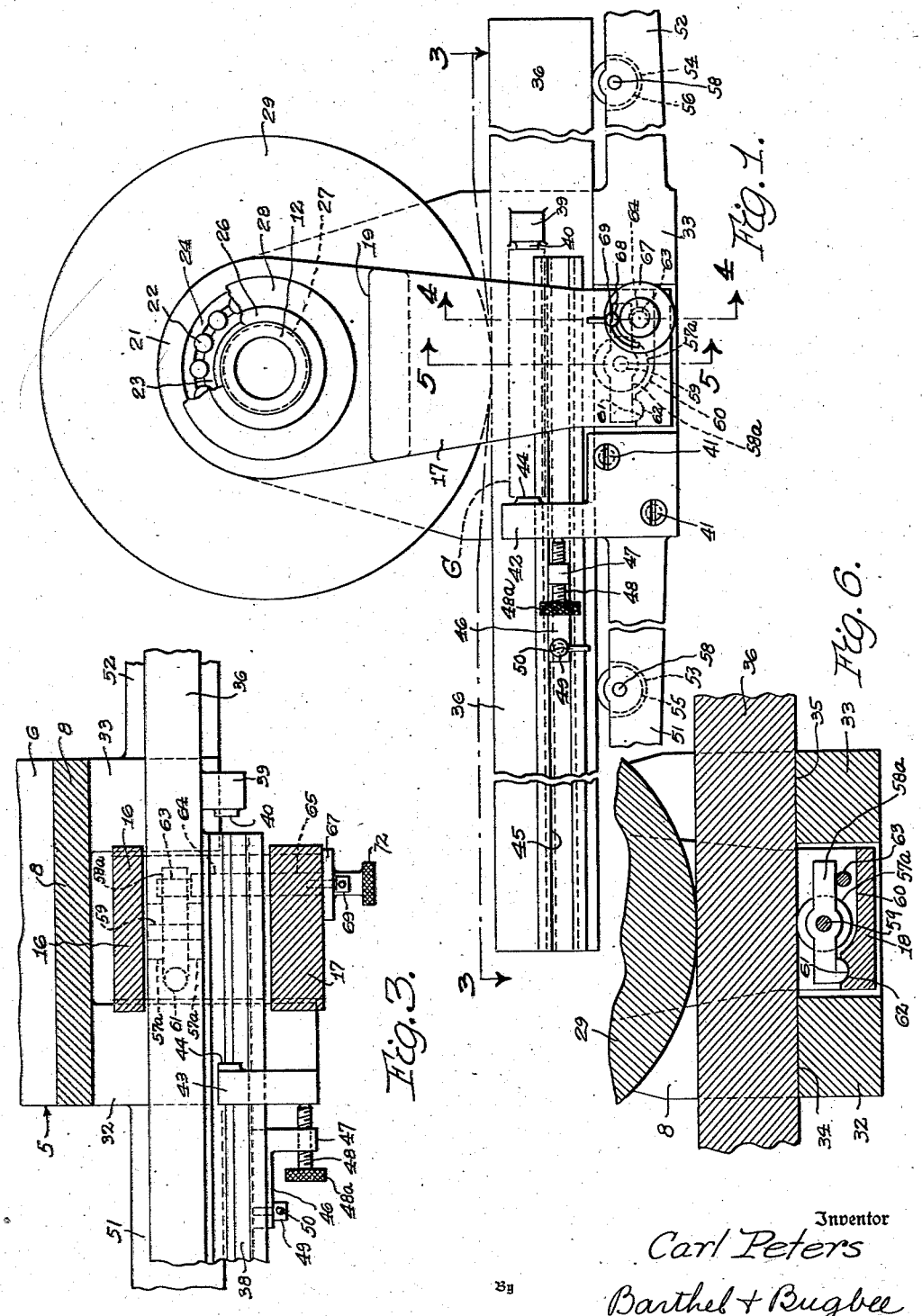
Inventor
Carl Peters
Barthel + Bugbee
Attorneys Dec. 9, 1947.   C. PETERS   2,432,336
INDEXING AND DIVIDING APPARATUS
Filed Feb. 16, 1945   2 Sheets-Sheet 2
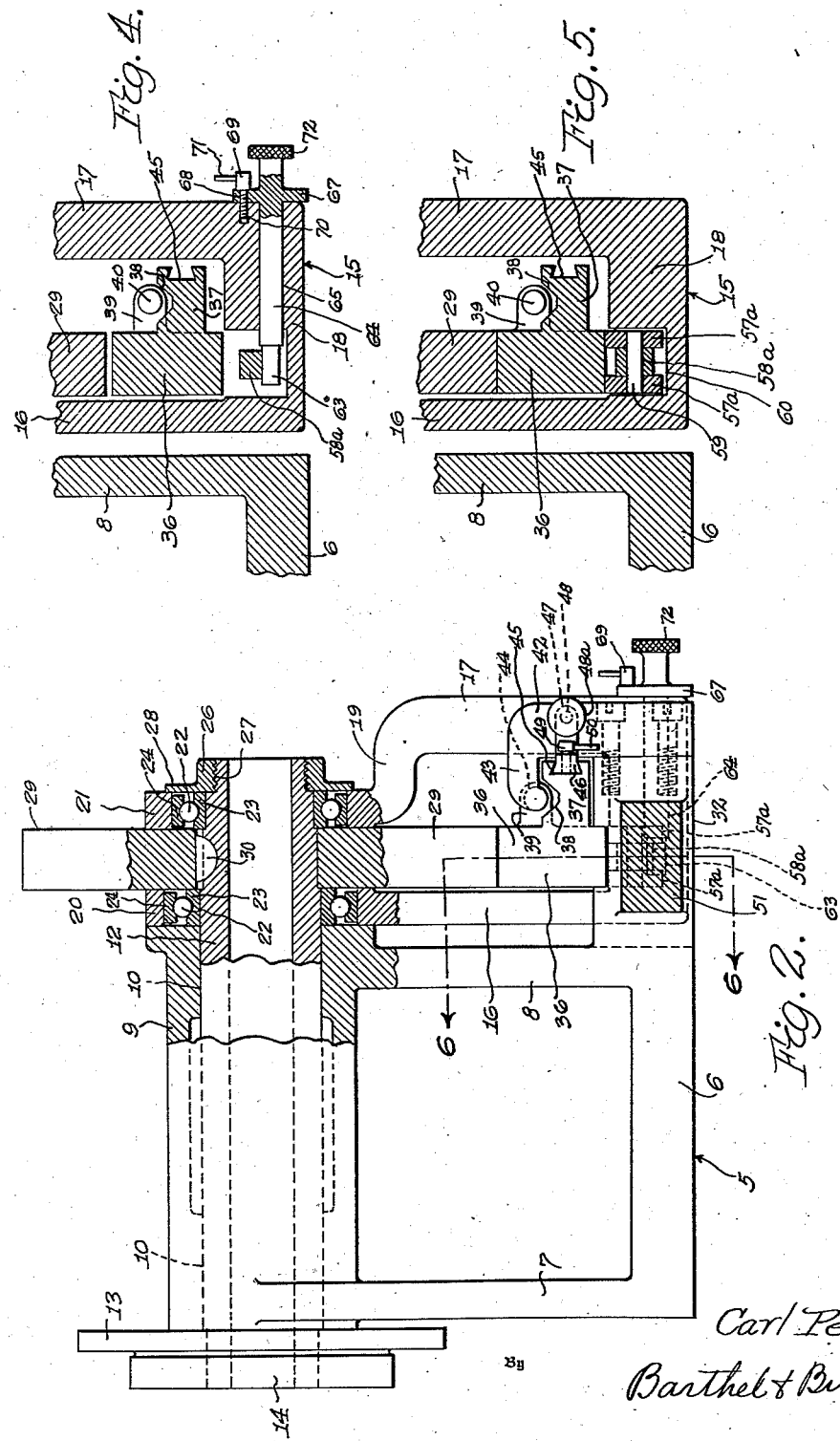
Inventor
Carl Peters
By
Barthel & Bugbee
Attorneys Patented Dec. 9, 1947

2,432,336

UNITED STATES PATENT OFFICE 2,432,336

INDEXING AND DIVIDING APPARATUS

Carl Peters, Dearborn, Mich.

Application February 16, 1945, Serial No. 578,335

3 Claims. (Cl. 33—174)

The present invention relates to indexing and dividing apparatus, and more particularly to an indexing and dividing head for supporting work pieces to be formed into circular templates or the like where extreme accuracy and precision is a major factor.

The primary object of the invention is to provide an indexing and dividing mechanism which is absolutely accurate and which may be operated with a high degree of precision, to position a circular or round work piece in proper relation with respect to a machine tool so as to remove metal therefrom at a predetermined location.

Another object of the invention is to provide an indexing and dividing head including a rotatable work piece support which is adapted to be rotated to various predetermined angular positions by means of a linearly movable operator in such a manner as to convert the linear distance through which said operator is moved to angular distances and thereby eliminate faulty computations and errors incident to dividing and indexing heads, the angular distance of which is indicated by being graduated into degrees, minutes and seconds.

Another object of the invention is to provide an indexing and dividing head which can be used for dividing the circumference of a work piece or the like into an equal number of divisional parts spaced one from the other an equal circumferential distance.

Another object of the invention is to provide an indexing and dividing apparatus which employs linear units of measurement in lieu of angular degree measuring units in such a manner as to obtain a higher degree of accuracy and precision.

Another object of the invention is to provide an indexing and dividing apparatus which is rendered absolutely accurate by the use of gauge blocks of predetermined known linear dimensions thereby avoiding errors occurring through the use of the angular unit of measurement which arise by reason of the inability of the human eye to determine angular distances in terms of degree graduations by the observations of sight lines and the like.

Another object of the invention is to provide an indexing and dividing mechanism which is comparatively simple to operate and which comprises a relatively small number of parts to become worn and out of order, whereby the accuracy of the indexing apparatus will be maintained and absolute precision obtained over long periods of use.

Other objects and advantages of the invention will become apparent during the course of the following description of the accompanying drawings, wherein:

Figure 1 is a front elevational view of the indexing and dividing apparatus embodying the invention;

Figure 2 is a side elevational view of the indexing and dividing head showing portions thereof broken away to illustrate various details of construction;

Figure 3 is a horizontal cross-sectional view taken on the irregular line 3—3 of Figure 1 looking in the direction of the arrows to illustrate the manner in which the gauge block may be inserted between a stop carried by the slide and a stop carried by the base;

Figure 4 is a vertical cross sectional view taken on line 4—4 of Figure 1 looking in the direction of the arrows and showing the manner in which the pressure adjusting means is controlled for urging the slide into frictional engagement with the disc-like wheel member;

Figure 5 is a vertical cross-sectional view taken on line 5—5 of Figure 1 illustrating in detail the manner in which the slide and disc-like wheel member are frictionally engaged and further showing the trough or groove for receiving gauge blocks or rods to thereby limit the rotational movement of the disc-like wheel member; and Figure 6 is a vertical cross-sectional view taken on line 6—6 of Figure 2 looking in the direction of the arrows for further illustrating the manner in which the slide is adapted to be frictionally held in engagement with the peripheral surface of the disc-like wheel member.

In the drawings, the reference character 5 will generally be employed to indicate a casting having a base 6 and a pair of upright supports 7 and 8 adjacent the ends thereof. The upper portions of the uprights 7 and 8 are connected by a tubular member 9 either integrated therewith or secured thereto. The tubular member 9 is provided adjacent its ends with reduced bearing portions 10 for receiving a tubular shaft 12, one end of which projects beyond the upright 8 and is adapted to be provided with a control mechanism which will be hereinafter more fully described. The other end of the tubular shaft 12 is provided with a work support including a disc 13 to which is attached a centering disc 14. The centering disc 14 may be removed from the disc 13 and said disc may be provided with a series of openings or radially extending key slots for receiving the heads of clamping bolts to facilitate the clamping of work thereto.

Freely mounted on the protruding end of the tubular shaft 12 is a yoke member 15 having parallel leg portions 16 and 17 secured together at one end by a connecting portion 18. The leg portion 17 is offset as at 19 so as to cooperate with the leg portion 16 and terminates in a pair of closely spaced bearing members 20 and 21, which encircle the projecting end of the tubular shaft 12 and are anti-frictionally supported thereon by anti-friction rolls or balls 22 mounted between the inner and outer race members 23 and 24 carried by the projecting end of the shaft 12 and bearing members 20 and 21 respectively. A locking cap 26 is secured to the threaded end 27 of the tubular shaft 12 and said locking cap is provided with a radially extending flange 28 adapted to overlie the outermost set of inner and outer race members as well as the anti-friction balls 22 so as to protect the same against the intrusion of dirt or the like.

Keyed to the tubular shaft 12 and disposed between the leg portions 16 and 17 of the yoke 15 is a disc-like wheel member 29 which is adapted to be held in place by the gib or key 30 so that the disc-like wheel member 29 will rotate with the tubular shaft 12. The inner race members 23 of the anti-friction bearing members 22 prevent lateral movement of the disc-like wheel member and the key 30 is intended to securely lock the disc-like wheel member to the rotary shaft.

In order to prevent turning movement of the yoke member 15, the base 6 of the indexing and dividing apparatus is provided with a pair of forwardly extending projections 32 and 33 which extend on opposite sides of the connecting portion 18 of the yoke. Formed in the upper side of the forwardly extending projections 32 and 33 is a pair of aligned notches 34 and 35 for slidably receiving a slide bar 36 which is rectangular in cross section and disposed with its upper edge in frictional contact with the peripheral surface of the disc-like wheel member 29. The slide bar 36 is freely slidable within the notches 34 and 35 so that upon movement thereof, the disc-like wheel member 29 will be rotated a corresponding amount.

Extending laterally from the slide bar 36 is a longitudinally extending platform 37 having a V-shaped groove 38 in its top wall for receiving gauge rods G of various lengths. A laterally extending stop projection 39 is formed on the slide 36 and is provided with a contact base 40 adapted to engage one end of the gauge rod G to thereby hold the same in position. The other end of the gauge rod is adapted to be engaged by a stop member including a bracket plate affixed to the end of the forwardly extending projection by screws or the like as at 41. Formed integral with the bracket plate is an upstanding portion 42 having a rearwardly extending portion 43 which terminates in a gauge rod contacting boss 44.

The outer face of the longitudinally extending platform 37 is provided with a dove-tailed slot 45 for receiving a slide plate 46 provided at one end with a tubular projection 47 for threadedly receiving the stop screw 48. One end of the stop screw 48 is adapted to contact the upwardly extending portion 42 of the bracket plate and the other end is provided with a knurled thumbpiece 48a to facilitate tightening of the gauge block between the movable and stationary contacts 40 and 44. A locking screw 49 is mounted in a threaded opening in the slide plate 46 so as to engage the bottom wall of the dovetailed slot or groove 45 and thereby lock the slide in a predetermined adjusted position. A fingerpiece 50 is provided on the locking screw 49 to facilitate turning thereof.

Formed integral with the forwardly extending projections 32 and 33 is a pair of oppositely extending wing portions 51 and 52 which are recessed as at 53 and 54 for receiving slide rod supporting rollers 55 and 56. The rollers 55 and 56 are journaled on suitable pins 58 extending through the wing extensions 51 and 52. Thus, the slide bar 36 will have its bottom wall engaged by the rollers 55 and 56 when the same is slid to and fro to thereby prevent the sagging of the bar in the extreme position for movement thereof.

In order to hold the slide bar 36 in frictional engagement with the peripheral surface of the disc-like wheel 29, a pair of pressure rollers 57a are adapted to engage the underside of the slide bar 36 and force the same upwardly a slight amount to prevent slippage between the slide bar and disc-like wheel member 29. The pressure rollers 57a are supported on a fulcrum lever 58a and are mounted on the ends of a small pivot pin 59 (Figure 5) in such a manner as to operate in a cutaway portion 60 of the connecting end of the yoke 15 (Figure 6). One end of the fulcrum lever 58a is formed with a semi-spherical projection 61 which is received in a socket recess 62 in the connecting portion 18 of the yoke, and the free-swinging end of the fulcrum lever is adapted to be adjusted by means of an eccentric pin 63 formed on the end of a rotary control shaft 64 (Figure 4). The rotary control shaft 64 is journaled in a suitable bearing opening 65 extending inwardly from the leg portion 17 of the yoke so that rotation of the shaft 64 will cause the eccentrically positioned pin 63 to move the fulcrum lever 58a on its fulcrum point 61. The outer end of the control shaft 64 is provided with an annular flange 67 having a circumferential slot 68 for receiving a locking screw 69 which is threaded in a suitable opening 70 in the yoke leg 17. A radially depending finger piece 71 is formed on the locking screw 69 to facilitate clamping of the annular flange 67 in its locked position. A knurled thumbpiece 72 is formed on the control shaft 64 to permit turning of the eccentric pin 63 and the adjusting of the pressure rollers 57. Thus, by adjusting the control shaft 64, various degrees of pressure may be exerted on the underside of the slide bar 36 to hold the upper surface thereof in frictional engagement with the peripheral surface of the disc-like wheel member 29. It is to be noted that the force exerted upwardly by the pressure rollers 57 exerts a downward pressure on the projecting end of the tubular shaft 12 and not on the base or frame structure so as not to distort the frame structure and cause inaccuracies to appear in the division of the work piece.

In operation, the base 5 is positioned on the bed or work table of a grinding machine or machine tool so that the rotary work support 13 is disposed in a plane at right angles to the plane of the grinding wheel or other metal removing tool. The slide 36 is moved to a position so that the contact 40 is in engagement with the contact 44 with the slide 36 being held in position by adjusting the slide plate 46 along the dovetailed keyway or slot 45 and adjusting the lock screw 48 so as to hold the surfaces of the contacts 40 and 44 in engagement. With this position as a starting point, the slide bar 36 will be at the limit of its left-hand travel and the disc-like wheel member 29 will be held against rotation so that work supported on the centering disc 14 and work supporting disc 13 may be operated on by the machine tool or grinding wheel to cut a notch or the like in the peripheral surface thereof.

It will be assumed that the number of divisions required in the peripheral surface of the work piece has already been determined and in order to move the wheel-like disc member 29 to a new position, it is simply necessary to select the correct gauge rod G for insertion between the contacts 40 and 44 after they have been slightly separated. On the second notch taken by the grinding machine, a gauge rod G of predetermined length is supported on the platform 37 within the groove 38 thereof and the slide 36 is moved until the contact 40 thereon engages one end of the gauge rod G and forces the same into engagement with the contact 44. By then adjusting the slide plate 46 and the locking screw 48, the disc-like wheel member 29 will be held in its predetermined angular position for being operated on by the machine tool or grinding wheel so as to form a notch in circumferentially spaced relation from the first notch in the peripheral surface of the work piece.

In order to avoid error, and insure the correct division of the work piece in accordance with predetermined angular positions of the notches, the first gauge rod G is removed and another gauge rod inserted of substantially twice the length of the first gauge rod. When the second gauge rod is inserted, the slide 36 may be moved to the right so that the second gauge rod may be positioned between the stops 40 and 44 so that when the slide 36 is again moved to the left, the gauge block will be held in position by the stop screw 48 and will be disposed between the contact portions 40 and 44 so as to lock the disc-like member 29 and the work piece in a third circumferentially spaced position. Each time the disc-like dividing head 29 is rotated and locked by means of various gauge blocks G and the locking screw 48, a new gauge block is employed, for if the gauge blocks were simply added one to the other, extreme accuracy would be prevented and the last notch cut in the work piece would be spaced a greater circumferential distance from the first notch.

As an example, in the operation of the dividing and indexing device, let it be supposed that the disc-like indexing head 29 is exactly 23 inches in circumference so that each time the slide bar 36 is moved 23 inches, the rotary dividing head 29 will be rotated one revolution. Again, let it be assumed that it is required to cut markings or form notches in a work piece such as an indexing disc or the like supported by the work supporting discs 13 which are equally and circumferentially spaced 22 degrees apart. Since the circumference of the disc-like indexing head 29 is 23 inches, it is simply necessary to multiply the angular distance (22 degrees) by the circumference of the disc-like wheel member which has been indicated as being 23 inches, and then dividing the multiplicand by 360 degrees. The quotient will equal the linear distance or spacing between the contacts 40 and 44 necessary to produce angular positioning of the indexing head and work piece from the starting point on an arc angle of 22 degrees. In the particular instance stated, a gauge block of 1.4055 would be necessary for positioning the wheel-like member or indexing head 29, 22 degrees from the starting point at which the first cut was taken with the contacts 40 and 44 in engagement. After the second notch or mark has been made in the work piece, the slide 36 is moved to the right after releasing the stop screw 48 so that a new gauge block may be inserted, whereupon return movement of the slide bar 36 will cause the stop 40 to engage one end of the newly positioned gauge block and force the other end into engagement with the contact 44. The lock screw 44 is then adjusted to tighten the gauge block in place and again lock the indexing head or wheel-like member 29 in position for the cutting of the third notch or mark in the work piece. The third marking or notch cut in the work piece will be spaced an angular distance of 44° from the initial starting point or 22° from the first cut marking or notch formed on the work piece. It is to be noted that the second-positioned gauge block G will have a length of 2.811 inches if the angular distance is again computed as above set forth in connection with the second mark or notch.

It will thus be seen that instead of employing two gauge rods or blocks of 1.4055 inches, for the positioning of the indexing or wheel-like head to form the third notch, a single gauge block of 2.811 inches is used so as to eliminate the .0001 error existing between two gauge rods or blocks of 1.4055 inches which would give a total of 2.8110 inches instead of the 2.8111 inches required. Obviously, if a series of gauge blocks are used by doubling the length thereof each time, considerable error would appear in the circumferential position of the last notch or marking in the work piece so that the last notch would not be exactly positioned and would be spaced a greater circumferential distance from the first cut or notch in the work piece. By eliminating the end fraction upon each division of the indexing head through computation of each gauge block or rod dimension required for each angular positioning of the indexing or wheel-like head 29, extreme accuracy and precision may be accomplished or acquired and master indexing plates and gears may be made having a higher degree of precision and accuracy than ones made with indexing heads where sight line markings are depended upon to control the positioning of the indexing head for various angular positions thereof.

When the angle of the circumferential spacing is not given, and instead the work piece is specified to be equally divided into a predetermined number of divisions, a gauge block is used for each division as pointed out in connection with the angular spacing about predetermined arcs.

For instance, suppose it is desired to divide the work piece into 73 equal divisions, circumferentially spaced with respect to one another. It is simply necessary to multiply the circumference by $\frac{1}{73}$, $\frac{2}{73}$, $\frac{3}{73}$, etc. Each computation would give the length in inches of the required gauge block.

Actually, the circumference would never be exactly 23 inches and in the present structure it is intended to form the disc 29 of a 7.5 inch diameter which will give a circumference of 23.5619 inches. As a concrete example, let it be supposed it is desired to divide the work piece into 73 equal circumferential divisions for the purpose of forming gears or notches therein as explained in connection with the description of the operation, when determining the required length of gauge block for a predetermined angular distance. With the circumference 23.5619 inches, the first division or $\frac{1}{73}$ of 23.5619 inches will equal .3327 inch. Thus a gauge block of this length is necessary to produce the first division. For the second division, 2/73 of the circumference (23.5619 inches) will equal .6455 inch which is the required length of gauge block for the second division. The remaining 71 divisions may be determined accordingly.

The advantages of applicant's invention will be apparent from the last example in that it is obvious that the use of a gauge block or rod of .3327 inch will give the exact positioning of the disc 29 and work piece for the first division and that if it is attempted to add another gauge block of the same length to the first one for obtaining the second division, the sum total of the gauge blocks would equal .6454 instead of the required .6455, and that when a single gauge block is used for the second division greater accuracy is facilitated and the difference, or 1/10000 error is eliminated and overcome. Instead of the second division being 1/10000 of an inch short as in the case of the use of two gauge blocks of .3327 inch, a single gauge block or rod of the exact length .6455 inch will produce accurate division and a high degree of precision.

The remaining notches or markings in the work piece may be formed in the peripheral surface thereof by repeating the operation above described and employing an individual gauge block of the required predetermined length for each setting.

In order to insure contactual engagement of the slide rod 36 with the disc-like indexing head 29, the eccentric pin 63 may be regulated and adjusted by simply turning the knurled fingerpiece 72 and then locking the same in position by tightening the screw 69 so as to clamp the radially extending flange 67 to the yoke 15. Obviously, the slide bar 36 can be so shaped as to provide a friction grip with the disc-like indexing head 29 as by forming the slide 36 with a V-shaped edge for engaging within a V-shaped groove in the periphery of the disc-like indexing head 29. Suitable locking means may be provided for the tubular shaft 12 to retain the same in a set position when the indexing and dividing device is employed in forming or producing master gears and the like.

It is to be understood that the form of the invention herein shown and described is to be taken as a preferred embodiment of the same and that various changes may be made in the shape, size and arrangement of parts without departing from the spirit of the invention or the scope of the subjoined claims.

What I claim is:

1. In an indexing and dividing apparatus, comprising a base, support means extending upwardly from said base, a rotary shaft journaled in said support means, work holding means on said shaft, a yoke member having its leg portions received on said shaft, an indexing disc keyed to said shaft and disposed between the legs of said yoke member, a slide bar slidably guided by the base and extending between the leg portions of said yoke in frictional engagement with said indexing disc, pressure rollers movably mounted in said yoke member adapted to urge the slide bar into frictional engagement with the indexing disc, projections carried by the slide bar and base arranged in opposed relation, means on the slide bar for supporting gauge rods of various lengths between said projections, and means carried by said slide bar for engaging one of said projections to lock the slide bar against movement and retain the projections in engagement with the ends of a gauge rod.

2. In an indexing and dividing apparatus, comprising a base, support means extending upwardly from said base, a rotary shaft journaled in said support means, work holding means on said shaft, a yoke member having its leg portions received on said shaft, an indexing disc keyed to said shaft and disposed between the legs of said yoke member, a slide bar slidably guided by the base and extending between the leg portions of said yoke in frictional engagement with said indexing disc, pressure rollers movably mounted in said yoke member adapted to urge the slide bar into frictional engagement with the indexing disc, projections carried by the slide bar and base arranged in opposed relation, means on the slide bar for supporting gauge rods of various lengths between said projections, means carried by said slide bar for engaging one of said projections to lock the slide bar against movement and retain the projections in engagement with the ends of a gauge rod, and means carried by the slide bar for quickly adjusting the position of said means for engaging one of said projections along the slide bar.

3. In an indexing and dividing apparatus, comprising a base, support means extending upwardly from said base, a rotary shaft journaled in said support means, work holding means on said shaft, a yoke member having its leg portions received on said shaft, an indexing disc keyed to said shaft and disposed between the legs of said yoke member, a slide bar slidably guided by the base and extending between the leg portions of said yoke in frictional engagement with said indexing disc, pressure rollers movably mounted in said yoke member adapted to urge the slide bar into frictional engagement with the indexing disc, projections carried by the slide bar and base arranged in opposed relation, means on the slide bar for supporting gauge rods of various lengths between said projections, means carried by said slide bar for engaging one of said projections to lock the slide bar against movement and retain the projections in engagement with the ends of a gauge rod, and manual control means for operating said means for urging the slide bar into frictional contactual engagement with said indexing disc.

CARL PETERS.

REFERENCES CITED

The following references are of record in the file of this patent:

UNITED STATES PATENTS

| Number | Name | Date |
|---|---|---|
| 1,428,509 | Weihgar | Sept. 5, 1922 |
| 2,087,947 | Pelphrey | July 27, 1937 |
| 2,108,414 | Schurr | Feb. 15, 1938 |
| 2,268,342 | Osplack | Dec. 30, 1941 |